United States Patent

Yoshida et al.

Patent Number: 6,057,932
Date of Patent: May 2, 2000

[54] DATA CONVERSION METHOD WITH TOTAL INK AMOUNT LIMITING FUNCTION

[75] Inventors: Yasunari Yoshida, Ama-gun; Masaaki Hori, Tajimi; Masaaki Hibino, Yokkaichi; Kiyotaka Ohara, Nagoya; Koji Kobayakawa, Ichinomiya; Masashi Ueda, Nagoya, all of Japan

[73] Assignee: Brother Kogyo Kabushiki Kaisha, Nagoya, Japan

[21] Appl. No.: 08/926,684

[22] Filed: Sep. 10, 1997

[30] Foreign Application Priority Data

Sep. 11, 1996 [JP] Japan ................................ 8-240590

[51] Int. Cl.[7] ................................ H04N 1/50; H04N 1/60
[52] U.S. Cl. ..................... 358/1.9; 358/502; 358/518; 358/534
[58] Field of Search ........................ 358/1.9, 502, 534, 358/296, 298, 518; 347/5, 6, 9, 15, 43

[56] References Cited

U.S. PATENT DOCUMENTS 5,225,849  7/1993  Suzuki et al. ........................ 358/296

*Primary Examiner*—Scott Rogers
*Attorney, Agent, or Firm*—Oliff & Berridge, PLC

[57] ABSTRACT

In S100, multilevel density data C, M, Y, and K for a subject pixel are read out from the data recording medium. Then, the total ink density ND is calculated in S110. It is judged whether or not the total ink density ND is higher than the predetermined limit value L1. When the total density ND is not higher than the value L1 (no in S120), the original density data C, M, Y, and K for the subject pixel are subjected to the binarization process in S140. When the total density ND is higher than the value L1 (yes in S120), on the other hand, the value of the multilevel data for each chromatic color component is reduced through an ink density reduction process in S130. The thus obtained reduced multilevel data C3, M3, and Y3 and the black multilevel data are subjected to the binarization process in S140.

45 Claims, 8 Drawing Sheets

FIG. 4
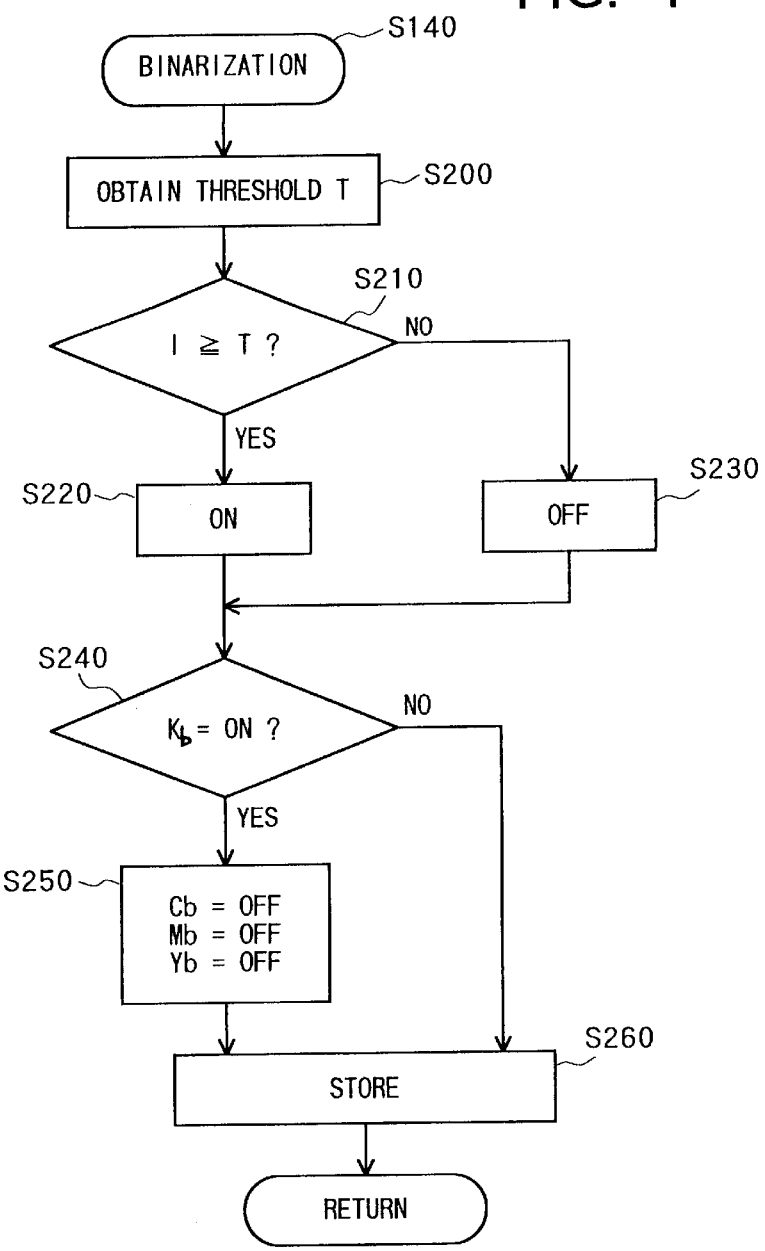
FIG. 5(a)
FIG. 5(b)
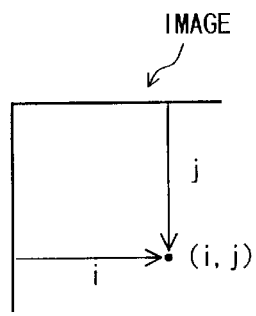

FIG. 8 (a)

|  ND-K \ MULTILEVEL DATA-K | 0 | 1 | ..... | ... | ..... | 510 |
|---|---|---|---|---|---|---|
| 0 | | | | | | |
| 1 | | | | | | |
| ⋮ | | | | F(ND-K, multilevel data-K) | | |
| ⋮ | | | | | | |
| ⋮ | | | | | | |
| 255 | | | | | | |

| ND-K | 0 | 1 | ..... | 510 |
|---|---|---|---|---|
| g(ND-K) | | | | |

41

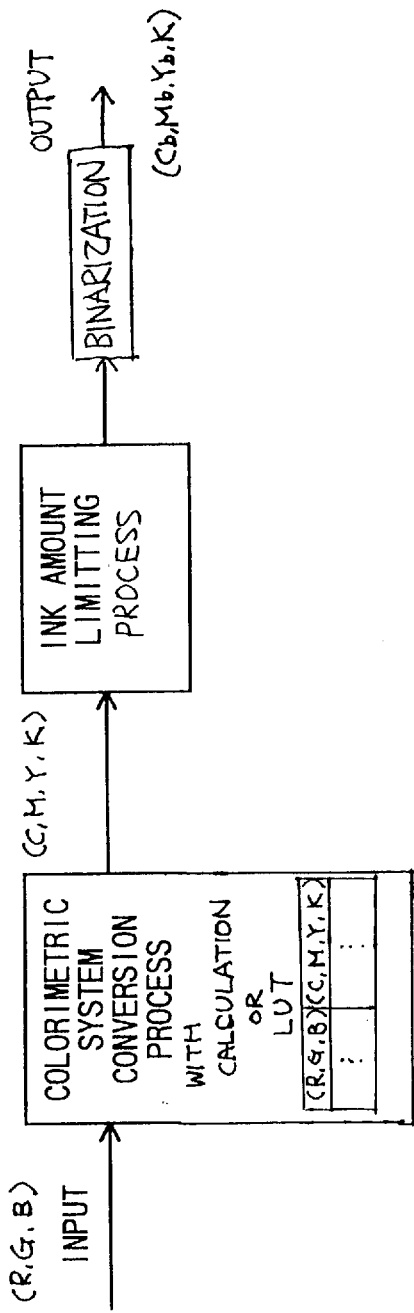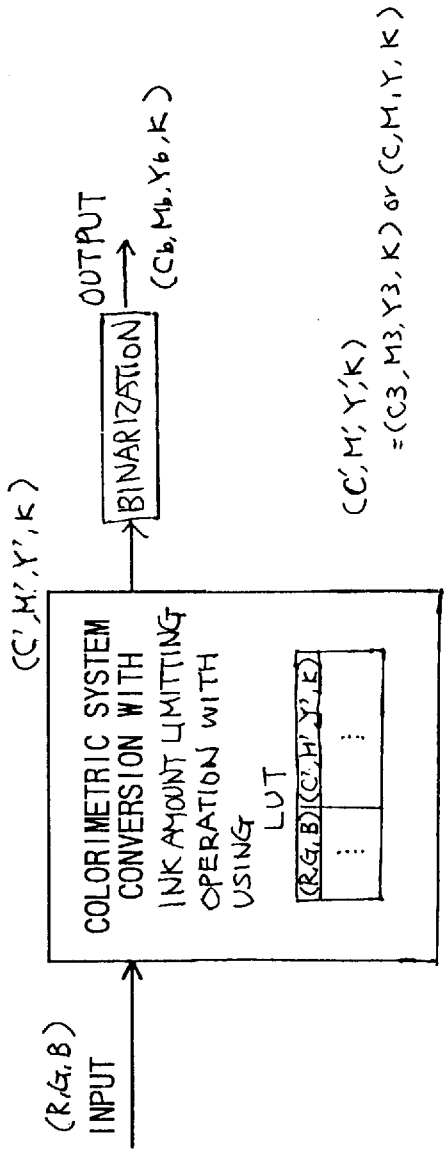

DATA CONVERSION METHOD WITH TOTAL INK AMOUNT LIMITING FUNCTION

BACKGROUND OF THE INVENTION

1. Field of the Invention

The present invention relates to a method of converting multilevel data for a plurality of colors into ink amount representing data, such as binary data, for the plurality of colors, the ink amount representing data being for controlling a color ink Jet printer to eject ink of the plurality of colors.

2. Description of Related Art

There has been conventionally known a method of converting multilevel data for a plurality of colors, indicative of a halftone color image, into binary data representative of a pseudo-halftone color image. The binary data controls a color printer to produce a corresponding dot printing color image using ink, toner, or the like. Various types of binarizing method are used for converting multilevel data into binary data. Representative examples of the method include a dithering method which uses a dither matrix.

A color ink jet printer, for example, is controlled with the binary data to selectively eject ink of the plurality of colors onto a print paper, thereby forming the desired color dot image. However, too much amount of ink may possibly be ejected onto a small area according to the image or content represented by the binary data. In this case, the print paper will be wrinkled. That is, a so-called cockling phenomenon occurs. Additionally, the ink located on the print paper will possibly drop along the print paper. This results in lowering of the printing quality.

SUMMARY OF THE INVENTION

The present invention is therefore attained to provide a method of converting multilevel halftone image data of a plurality of colors into ink amount representing data of the plurality of colors which can allow an ink jet printer to print a pseudo-halftone color image while preventing the cockling phenomenon.

In order to attain the above and other objects, the present invention provides a method of converting multilevel data indicative of a color halftone image into ink amount representing data indicative of a corresponding color pseudo-halftone image, the method comprising the steps of: inputting multilevel data of a plurality of colors which indicate densities of the plurality of colors to reproduce a color halftone image; selectively performing a reduction process to reduce quantity of the multilevel data of at least one of the plurality of colors, thereby obtaining quantity-reduced multilevel data for the at least one color; and converting the selectively quantity-reduced multilevel data of each color into ink amount representing data which represents ink amount of a corresponding color to reproduce the color halftone image. The conversion step may convert the selectively quantity-reduced multilevel data of each color into binary data which represents whether or not to eject ink of a corresponding color to reproduce the color halftone image. The reduction process may be attained to reduce the quantity of the multilevel data in accordance with the quantity of the multilevel data.

According to another aspect, the present invention provides a method of adjusting multilevel data indicative of a color halftone image so as to reproduce the color halftone image with a limited amount of ink, the method comprising the steps of: inputting multilevel data of a plurality of colors which indicate densities of the plurality of colors to reproduce a color halftone image; and selectively performing a reduction process to reduce quantity of the multilevel data of at least one of the plurality of colors, thereby obtaining quantity-reduced multilevel data for the at least one color, the selectively quantity-reduced multilevel data indicating the color halftone image with a limited amount of ink.

According to still another aspect, the present invention provides a device for converting multilevel data indicative of a color halftone image into ink amount representing data indicative of a corresponding color pseudo-halftone image, the device comprising: means for inputting multilevel data of a plurality of colors which indicate densities of the plurality of colors to reproduce a color halftone image; means for selectively performing a reduction process to reduce quantity of the multilevel data of at least one of the plurality of colors, thereby obtaining quantity-reduced multilevel data for the at least one color; and means for converting the selectively quantity-reduced multilevel data of each color into ink amount representing data which represents ink amount of a corresponding color to reproduce the color halftone image.

According to a further aspect, the present invention provides a device for adjusting multilevel data indicative of a color halftone image so as to reproduce the color halftone image with a limited amount of ink, the device comprising: means for inputting multilevel data of a plurality of colors which indicate densities of the plurality of colors to reproduce a color halftone image; and means for selectively performing a reduction process to reduce quantity of the multilevel data of at least one of the plurality of colors, thereby obtaining quantity-reduced multilevel data for the at least one color, the selectively quantity-reduced multilevel data indicating the color halftone image with a limited amount of ink.

According to still another aspect, the present invention provides a program storage medium for storing data of a program indicative of a process for converting multilevel data indicative of a color halftone image into binary data indicative of a corresponding color pseudo-halftone image, the program comprising: a program of inputting multilevel data of a plurality of colors which indicate densities of the plurality of colors to reproduce a color halftone image; a program of selectively performing a reduction process to reduce quantity of the multilevel data of at least one of the plurality of colors, thereby obtaining quantity-reduced multilevel data for the at least one color; and a program of converting the selectively quantity-reduced multilevel data of each color into ink amount representing data which represents ink amount of a corresponding color to reproduce the color halftone image.

BRIEF DESCRIPTION OF THE DRAWINGS

The above and other objects, features and advantages of the invention will become more apparent from reading the following description of the preferred embodiment taken in connection with the accompanying drawings in which:

FIG. 4 is a flowchart of a binarization process in the ink amount limiting binarization processing of FIG. 3;

FIG. 5(a) shows a dither matrix used in the binarization process of FIG. 4;

FIG. 5(b) shows a pixel location on an image to be binarized;

FIG. 8(a) shows a table 40 storing a plurality of quantity-reduced data;

FIG. 8(b) shows another table 41 storing a plurality of reduction coefficients;

FIG. 9(a) shows a block diagram showing a modification of converting color data from one colorimetric system into color data of another system and then performing the binarization processing; and FIG. 9(b) shows a block diagram showing another modification of converting color data from one colorimetric system into color data of another system while simultaneously performing the ink amount limiting process and then binarizing the color data.

DETAILED DESCRIPTION OF THE PREFERRED EMBODIMENTS

Figure 1:
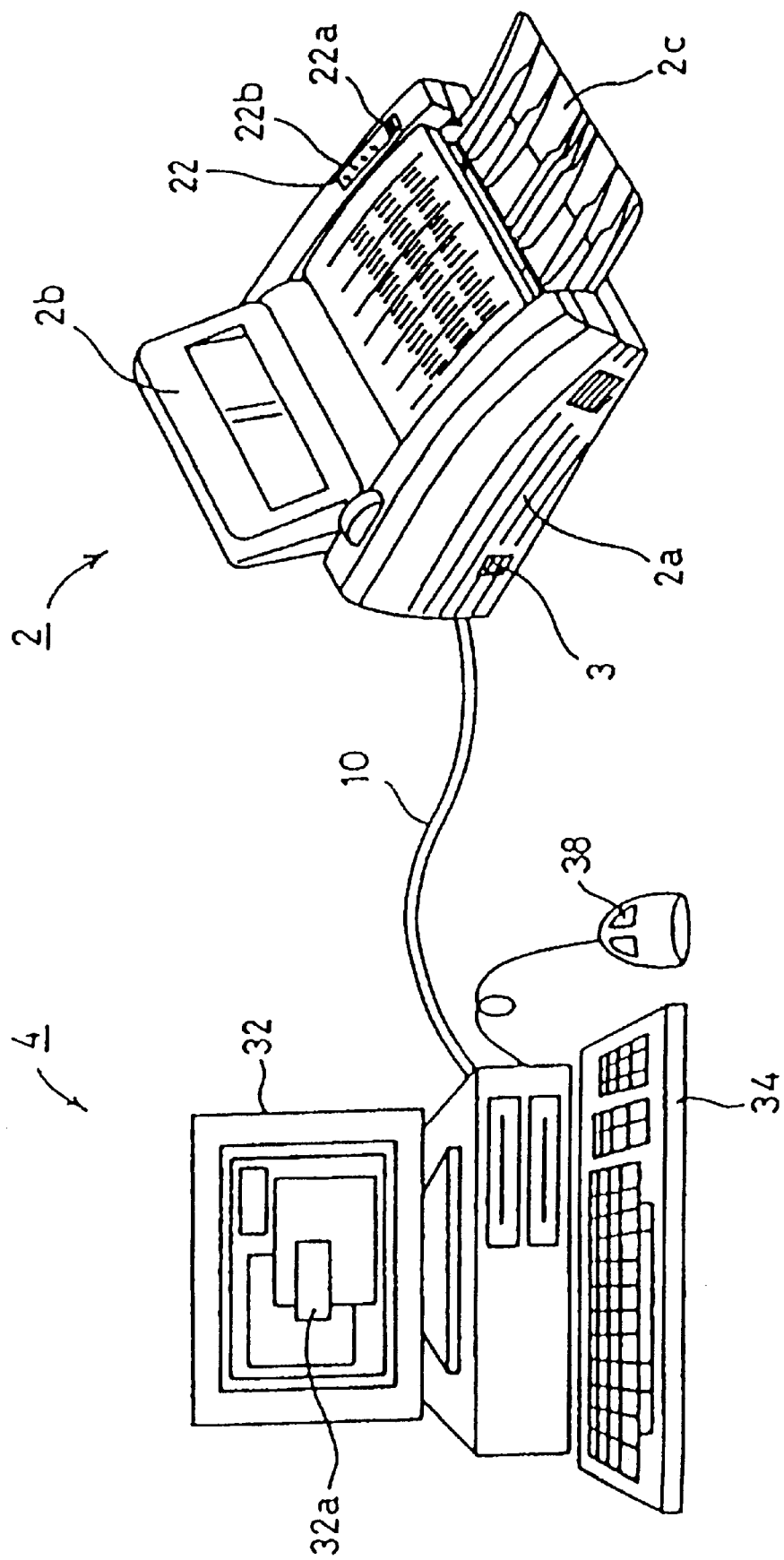
FIG. 1 shows a printer system for performing an ink amount limiting binarization method of the present invention, wherein a personal computer is connected to a printer.

A data conversion method according to preferred embodiments of the present invention will be described while referring to the accompanying drawings wherein like parts and components are designated by the same reference numerals.

A first embodiment will be described below with reference to FIGS. 1 through 6(a).

Figure 2:
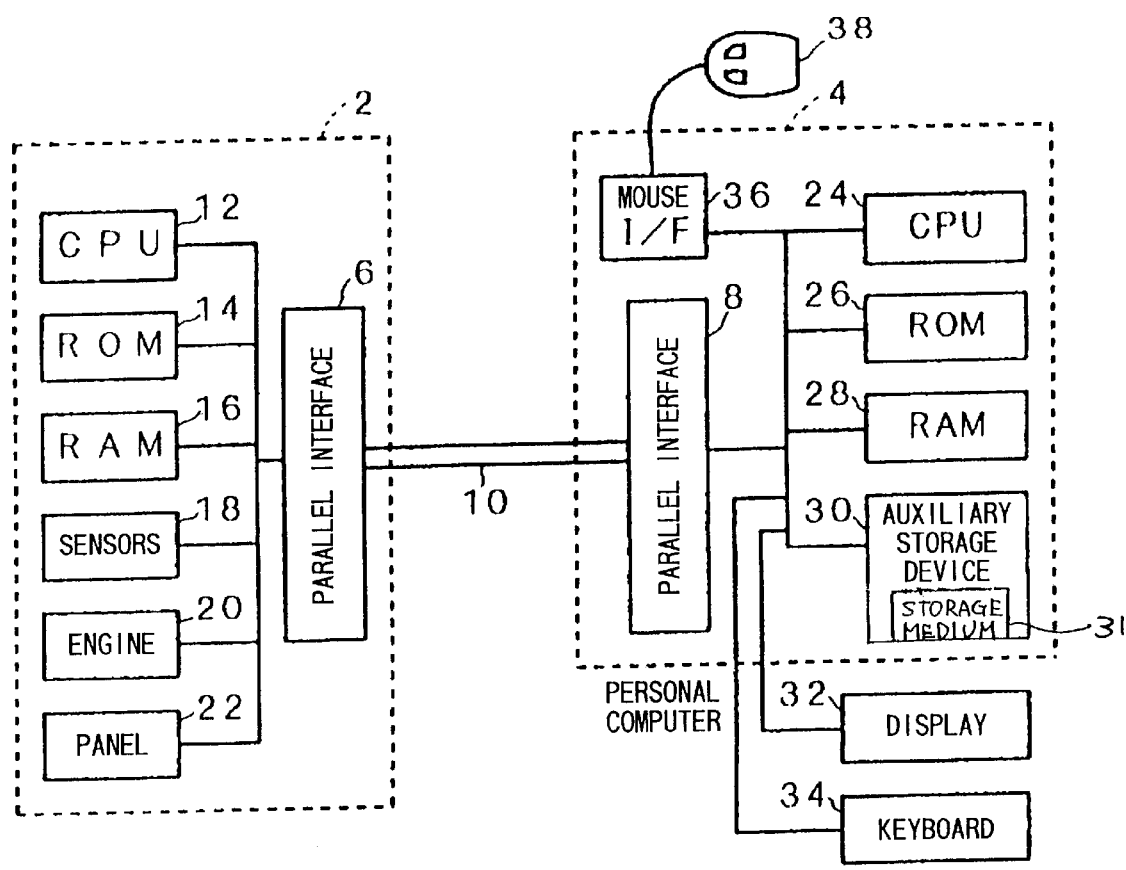
FIG. 2 is a block diagram of the printer system of FIG. 1.

FIGS. 1 and 2 show a printing system for performing the method of the first embodiment. In the printing system, a personal computer 4 is connected to a color ink jet printer 2 by a parallel printer cable 10 via interface units 6 and 8.

The printer 2 includes a main body 2a, a paper feed unit 2b, and a paper discharge tray 2c. During the printing process, one sheet of paper is fed at a time from the paper feed unit 2b into an image forming unit (not shown). A print head (not shown), installed inside the main body 2a, ejects ink of cyan, magenta, yellow, and black colors on the sheet of paper. Then, the paper is discharged onto the paper discharge tray 2c.

Internally, the printer 2 includes the interface unit 6 for interfacing with the personal computer 4 in accordance with a predetermined printer parallel interface standard such as a standard "IEEE 1284"; a CPU 12 for executing various processes according to various control programs; a ROM 14 storing various print control programs; a RAM 16 for use as a work area for calculations to be executed by the CPU 12 and for storing results of those calculations and various settings; various sensors 18, including a paper feed sensor, a paper discharge sensor, and an ink remaining amount sensor; and an engine 20 including a main motor for driving mechanical portions in the printer 2. A control unit 22 and a power switch 3 are also provided in the main body 2a of the printer 2 as shown in FIG. 1. These components 12, 14, 16, 18, 20, and 22 are connected to the interface 6 via bus line. The control unit 22 includes a push-button switch 22a for providing simple instructions to the laser printer 2, and LED lights 22b for displaying the status of instruction controls to allow the user to set prescribed conditions.

The personal computer 4 includes the interface unit 8; a CPU 24; a ROM 26; a RAM 28; an auxiliary storage unit 30; a color display 32; a keyboard 34; and a mouse interface 36 which are connected to one another via bus line. A mouse unit 38 is connected to the mouse interface 36.

The interface unit 8 is for interfacing with the laser printer 2 in accordance with the predetermined parallel interface standard. The CPU 24 is for executing various processes according to various control programs stored in the ROM 26 and the RAM 28. The ROM 26 stores therein various control programs. The auxiliary storage unit 30 is constructed from a disk driver, for example, for retrieving data and external programs from an auxiliary storage medium 31 such as floppy disks, CD-ROMs, magnetooptical disks, and the like. The external programs include an operating system program, application programs, and a printer device driver program. As will be described below, the printer device driver program includes an ink amount limiting binarization program shown in FIGS. 3 and 4. The RAM 28 is for temporarily storing therein data and programs such as the operating system program, the application programs, and the printer device driver program, which are read from the auxiliary storage unit 30 when these programs are to be executed. The RAM 28 is also for storing various settings and results of calculations attained by the CPU 24.

The display 32 is for displaying a color halftone image, menus, and a status monitor of the printer 2, and the like. The keyboard 34 is for enabling a user to input various instructions including an instruction to start the ink amount limiting binarization process. The mouse unit 38 is for moving a mouse cursor displayed on the display 32 and for allowing the user to input instructions. The mouse unit 38 is for communicating data and instructions with the CPU 24 via the mouse interface 36.

The personal computer 4 and the laser printer 2 exchange, through a control line in the IEEE 1284 cable 10, handshake signals needed for transmitting data. The handshake signals include strobe signals and acknowledge signals. The personal computer 4 transmits print data and instruction commands to the printer 2 through a data line in the IEEE 1284 cable 10. The above-described operations are performed based on the printer driver program retrieved from the auxiliary storage unit 30 and executed by the CPU 24. When the printer 2 is in a type which can be executed in a byte mode, the printer 2 executes printing processes according to the instruction commands and the print data, and outputs its status data to the personal computer 4 in the form of status signals. When receiving the status signals, the computer 4 controls the color display 32 to display the status monitor in its status monitor display portion 32a.

Figure 3:
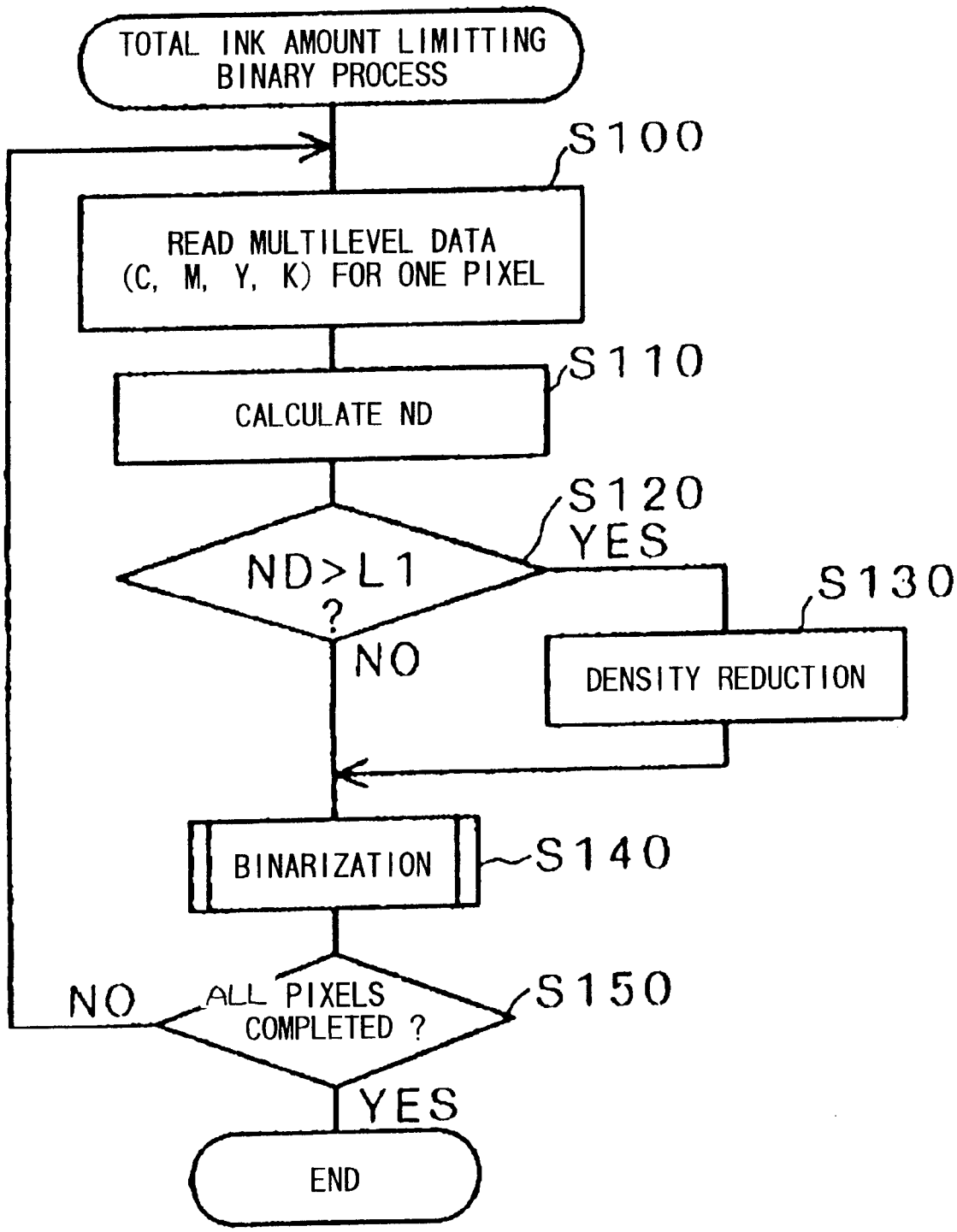
FIG. 3 is a flowchart of the ink amount limiting binarization processing of a first embodiment.
Figure 6:
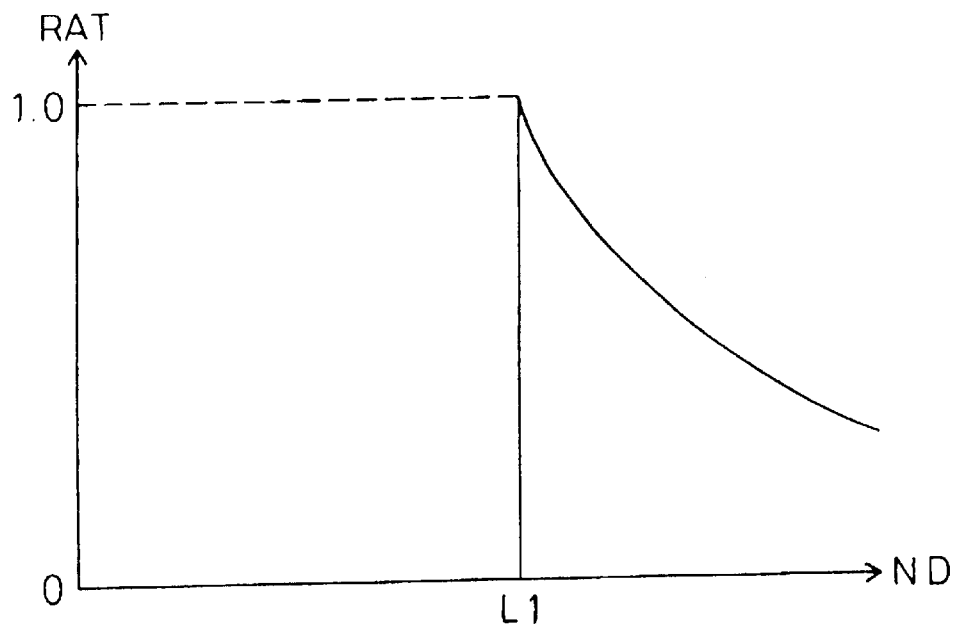
FIG. 6(a) shows a relationship between a reduction coefficient RAT and the total ink density ND according to the first embodiment.
FIG. 6(b) shows a relationship between a reduction coefficient RAT and the total ink density ND according to a second embodiment.
Figure 6:
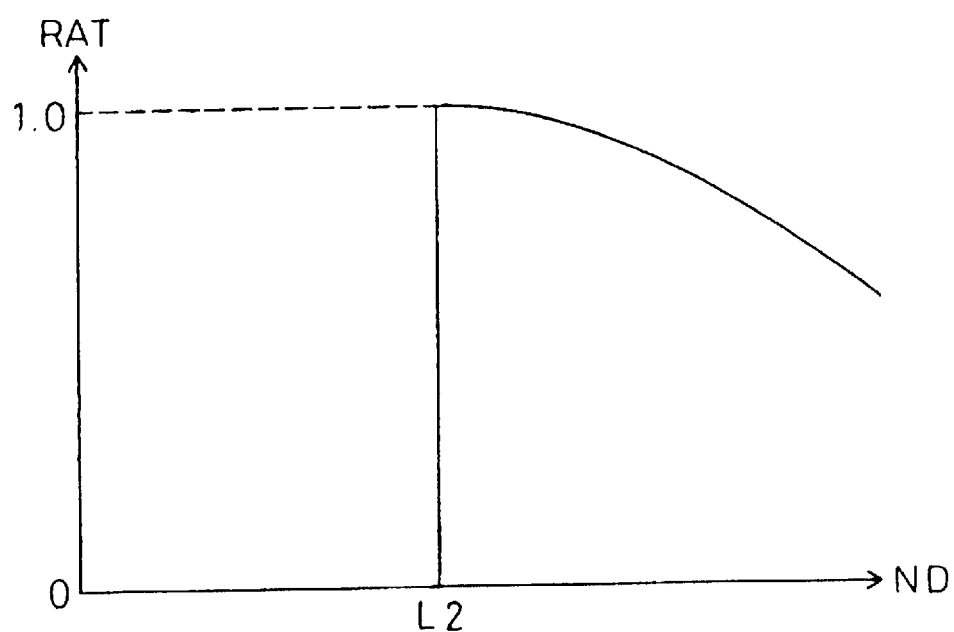

According to the present invention, the program of the printer driver includes, as a part thereof, the total ink amount limiting binarization process program shown in FIGS. 3 and 4. The ink amount limiting binarization process program is executed in response to the operator's manipulation of the personal computer 4 to start binarization. The ink amount limiting binarization process program is for binarizing, with using a predetermined dither matrix D, color halftone image data, constructed from multilevel data for a plurality of colors, into binary data indicative of the plurality of colors with a limited ink amount. The dither matrix D is a 4×4 matrix wherein sixteen threshold values TH(x, y) are arranged as shown in FIG. 5(a). It is noted that data of the ink amount limiting binarization program and data of the dither matrix D have been originally stored in the auxiliary storage medium 31 such as a floppy disk, a CD-ROM, a magnetooptical disk, or the like.

In this example, the original color halftone image data to be binarized is defined in a CMYK colorimetric system which defines colors by three subtractive primaries, i.e., cyan (C), magenta (M), and yellow (Y) and one achromatic color, i.e., black (K). The original color halftone image data represents a color halftone image constructed from a plurality of picture elements (pixels) defined by two-dimensional coordinates (i, j) as shown in FIG. 5(b). The original halftone image data includes a plurality of sets of CMYK multilevel data (C, M, Y, K) each representing color density of a corresponding pixel (i, j). Multilevel data for each color component has a value in a range from 0 to 255, for example, for indicating a corresponding color component density.

It is noted that in this example, data for each of the chromatic colors C, M, and Y is designed to include therein data of the achromatic color K. Accordingly, data for each chromatic color (C, M, or Y) indicates a value of the sum of a black color density K indicative of its brightness and a corresponding chromatic color density (C1, M1, or Y1) indicative of its chroma or saturation. Data of the achromatic color K has the minimum value among those of the chromatic color data C, M, and Y. For example, when a color data set (C, M, Y, K) for a certain pixel is (255, 255, 100, 100), the color data set indicates that the subject pixel has cyan density C1 of 155, magenta density M1 of 155, yellow density Y1 of 0, and black density of 100. It is therefore sufficient that the original color halftone image data be constructed from only three chromatic color data C, M, and Y. It is possible to determine black data as the minimum value among the three chromatic color data values C, M, and Y.

The color halftone image data having the above-described structure is originally stored in the RAM 28 or in a data storage medium 31 set in the auxiliary storage device 30. During the ink amount limiting binarization process of FIGS. 3 and 4, the color data set (C, M, Y, K) for each pixel (i, j) is converted into a binary color data set (Cb, Mb, Yb, Kb). Each of the binary color data Cb, Mb, Yb, and Kb has a value of zero (0; OFF) or one (1; ON). Binary color data of one (ON) will control the printer 2 to eject ink of a corresponding color on the subject pixel position (i, j) on the print paper. Binary color data of zero (OFF) will control the printer 2 not to eject ink of a corresponding color on the subject pixel position. Thus, the printer 2 is controlled by the binary color data (Cb, Mb, Yb, and Kb) to print, on the print paper, a pseudo-halftone color image representing the original color halftone image. The print paper is then outputted from the printer 2.

During the ink amount limiting binarization process, the binary color data (Cb, Mb, Yb, and Kb) is produced so that the total amount of ink to be ejected onto each pixel location (i, j) is limited below a predetermined amount. Accordingly, the printed image does not suffer from the cockling problem.

The ink amount limiting binarization process of the present embodiment will be described below with reference to FIGS. 3–6(a).

First, in S100, the CPU 24 reads out a multilevel data set (C, M, Y, K) for one pixel (i, j) from the RAM 28 or the data storage medium 31 set in the data storage device 30.

Next, in S110, a total ink density ND is calculated for the subject pixel (i, j).

The total ink density ND is calculated in a manner described below.

First, the value K is subtracted from each of the values C, M, and Y as expressed by the following formulas, thereby obtaining a correct ink density value C1, M1, Y1:

$$C1 \leftarrow C-K \quad (1)$$

$$M1 \leftarrow M-K \quad (2)$$

$$Y1 \leftarrow Y-K \quad (3)$$

As described already, data for each of the chromatic colors C, M, and Y is designed to include therein data of the achromatic color K. Accordingly, when the color data set (C, M, Y, K) for the subject pixel is (255, 255, 100, 100), the color data set indicates that that pixel has cyan density C1 of 155, magenta density M1 of 155, yellow density of 0, and black density K of 100. Those correct and real chromatic color densities C1, M1, and Y1 are calculated by the above-described formulas (1)–(3).

Next, the total ink density ND is calculated as a total amount of the corrected chromatic color density values C1, M1, and Y1, and the original black value K as represented by the following formula (4):

$$ND \leftarrow C1+M1+Y1+K \quad (4)$$

The total ink density ND therefore indicates a total amount of ink of cyan, magenta, yellow, and black required to reproduce the subject pixel color. Thus, the total ink density ND can approximately indicate the total amount of ink to be ejected from the printer 2 on the subject pixel location (i, j) when the printer 2 is controlled by a binary data set (Cb, Mb, Yb, Kb), which is obtained through a normal binarization operation based on the original multilevel data set (C, M, Y, K).

Next, in S120, it is judged whether or not the total ink density ND is higher than a predetermined limit value L1. The limit value L1 is determined as lower than a predetermined possible maximum value NDX, to which the total amount ND of any pixel can reach at maximum, and as indicative of a maximum total amount of ink which will not develop the cockling phenomenon. The maximum NDX is equal to 510 in this example because the total ink amount ND becomes maximum when K is equal to zero (0). The total amount ND becomes 510 when (C, M, Y, K)=(255, 255, 0, 0), for example. In this case, ND=510 because ND=(C−K)+(M−K)+(Y−K)+K=255+255=510. In this example, the limit value L1 is set to 382. This limit value L1 is determined according to the amount of ink to be supplied on the print paper within a predetermined small area, such as 2×2 pixel matrix area, by the ink ejection operation. It is noted that the limit value L1 may be set immediately lower than the maximum total amount of ink which will not produce the cockling phenomenon.

When the total ink density ND is not higher than the limit value L1 (No in S120), the original multilevel data set (C, M, Y, K) is subjected to a binarization process of S140. That is, the data set (C, M, Y, K) for the subject pixel (i, j) is converted into a binary data set (Cb, Mb, Yb, Kb). The binary data set is then stored in the RAM 28 or the data storage medium 31 set in the device 30 before being supplied to the printer 2.

As shown in FIG. 4, during the binarization process of S140, first in S200, a threshold TH(x, y) for the subject pixel (i, j) shown in FIG. 5(b) is retrieved from the dither matrix D shown in FIG. 5(a). The location (x, y) of the threshold TH(x, y) to be retrieved for the subject pixel (i, j) is determined by the following formula:

x=a remainder obtained when the value i is divided by the value of four (4)

y=a remainder obtained when the value j is divided by the value of four (4)

For example, when the subject pixel location is (7, 10), the location (x, y) is determined as (3, 2). Accordingly, a threshold of 176 is read out from the dither matrix D.

Then, each of the color values I (=C, M, Y, and K) of the color data set (C, M, Y, K) is compared with the retrieved threshold T in S210. When I≧T (yes in S210), corresponding binary data Ib (=Cb, Mb, Yb, or Kb) is set to one (ON) in S220. When I<T (no in S210), on the other hand, binary data Ib (=Cb, Mb, Yb, or Kb) is set to zero (OFF) in S230. The binary data of ON (one) is for controlling the printer 2 to eject ink of a corresponding color, while the binary data of OFF (zero) is for controlling the printer 2 not to eject ink of a corresponding color.

Then, in S240, it is judged whether or not the black multilevel data K has been converted into one (ON). When Kb=1 (ON), the subject pixel (i, j) should be located with black ink. Accordingly, the remaining chromatic color data Cb, Mb, and Yb are all corrected into zero values (OFF) in S250. When Kb=0 (OFF), on the other hand, the values Cb, Mb, and Yb are not changed. Then, in S260, the thus determined binary data set (Cb, Mb, Yb, Kb) is stored in the RAM 28 or the data storage medium 31 set in the device 30. Thus, the binarization process is ended.

When the total ink density ND is higher than the limit value L1 (yes in S120), on the other hand, it is determined that the cockling problem will possibly occur when ink is ejected on the pixel (i, j) to attain the total ink density ND. In this case, therefore, a density reduction operation is performed in S130. This density reduction operation is performed in a manner described below.

First, a reduction coefficient RAT is calculated as indicated by the following formula (5):

$$RAT f(L1-K)/(ND-K)=(L1-K)/\{(C-K)+(M-K)+(Y-K)\} \quad (5)$$

The reduction coefficient RAT has a relationship with respect to the total ink density ND as shown in FIG. 6(a). That is, the reduction coefficient RAT is a value higher than zero (0) and lower than one (1), and gradually decreases as the value ND increases.

Then, the corrected values C1, M1, and Y1 for the chromatic colors are multiplied by the reduction coefficient RAT as indicated by the following formulas (6)–(8), thereby obtaining quantity-reduced corrected values C2, M2, and Y2:

$$C2 \leftarrow C1 \times RAT \quad (6)$$

$$M2 \leftarrow M1 \times RAT \quad (7)$$

$$Y2 \leftarrow Y1 \times RAT \quad (6)$$

Then, the quantity-reduced corrected values C2, M2, and Y2 are added with the original black data K as indicated by the following formulas (9)–(11), thereby obtaining quantity-reduced multilevel data C3, M3, and Y3:

$$C3 \leftarrow C2+K \quad (9)$$

$$M3 \leftarrow M2+K \quad (9)$$

$$Y3 \leftarrow Y2+K \quad (9)$$

The thus obtained data C3, M3, and Y3 and the original black data K are subjected to the binarization process of S140. That is, each of the values C3, M3, Y3, and K is compared with a threshold T read out from the dither matrix D at a corresponding location, and is converted into binary data Cb, Mb, Yb, and Kb. Thus obtained binary data set (Cb, Mb, Yb, Kb) is stored in the RAM 28 or the data storage medium 31 set in the device 30.

Next, in S150, it is judged whether or not original color data (C, M, Y, K) of all the pixels (i, j) have been subjected to the above-described processings. When any pixels remain unprocessed (no in S150), the process returns to S100, and the above-described processing is performed onto the next pixel. When all the pixels are completely subjected to the above-described processing (yes in S150), on the other hand, the ink amount limiting binarization processing is ended. As a result, the plurality of multilevel data sets (C, M, Y, K) of the original color halftone image are converted into a plurality of binary data sets (Cb, Mb, Yb, Kb) indicative of a color pseudo-halftone image representative of the original image. The printer 2 is then controlled with the binary data sets (Cb, Mb, Yb, Kb) to print the color pseudo-halftone image onto a print paper.

As described above, according to the present embodiment, multilevel density data C, M, Y, and K for a subject pixel are read out in S100 from the data recording medium. Then, the total ink density ND is calculated in S110. It is judged whether or not the total ink density ND is higher than the predetermined limit value L1. When the total density ND is not higher than the value L1 (no in S120), the original density data C, M, Y, and K for the subject pixel are subjected to the binarization process in S140. When the total density ND is higher than the value L1 (yes in S120), on the other hand, the value of the multilevel data for each chromatic color component is reduced through an ink density reduction process in S130. The thus obtained reduced multilevel data C3, M3, and Y3 and the black multilevel data are subjected to the binarization process in S140.

Thus, when the total ink density ND of a certain pixel is judged as higher than the limit value L1, the cockling problem may possibly occur at the subject pixel. In this case, the chromatic color data C, M, and Y is subjected to the reduction process represented by the formulas (5)–(8). As a result, the sum of the quantity-reduced corrected values C2, M2, and Y2 and the original black value K becomes equal to the value L1. That is, C2+Y2+M2+K=L1. The total amount, C2+Y2+M2+K, approximately indicates a total ink amount to be ejected onto the subject pixel location. Because the total ink amount is thus limited to the amount L1, it is possible to prevent the cockling problem.

According to the formulas (6)–(8), the multilevel data of the chromatic colors for the subject pixel (i, j) is reduced dependent on the quantity of the original multilevel data of that pixel (i, j). This is because the reduction coefficient RAT is determined dependent on the value K and the value ND. Thus, multilevel data of chromatic colors of respective pixels are not reduced in a fixed manner, but are reduced in different manners. The quantity reduction operation will not deteriorate the color reproducibility.

In the above-described first embodiment, the calculation process of the formulas (1)–(3) serves to calculate the corrected values C1, M1, and Y1 for the chromatic colors of the multilevel data (C, M, Y, K). The calculation process of the formulas (4)–(8) serves to reduce the quantity of the chromatic color data, thereby obtaining quantity-reduced corrected values C2, M2, and Y2. Especially, the processes in S110 and S120 serve to compare the total ink amount to be ejected on the subject pixel (i, j) with the predetermined limit value L1, and the process of S130 using the formulas (5)–(8) serves to calculate the quantity-reduced corrected values C2, M2, and Y2. The process of the formulas (9)–(11) serves to calculate the quantity-reduced multilevel values C3, M3, and Y3 which will be subjected to the binarization process of S140.

A second embodiment will be described below with reference to FIGS. 6(b) and 7.

The second embodiment is the same as that of the first embodiment except for the processes in S120 and S130.

Figure 7:
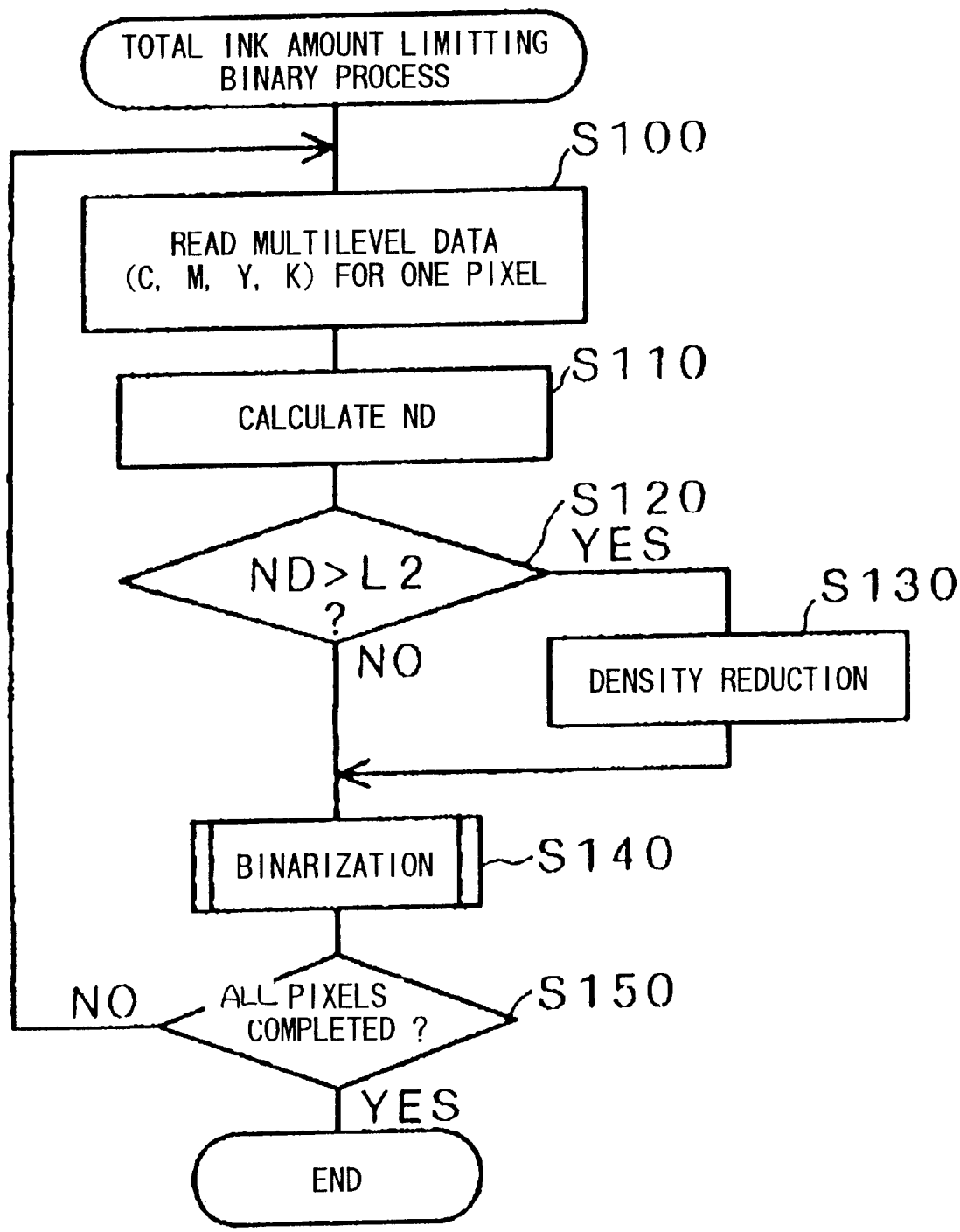
FIG. 7 is a flowchart of the ink amount limiting binarization processing according to the second embodiment.

According to the present embodiment, as shown in FIG. 7, the judgment process of S120 judges whether or not the total ink density ND is higher than another predetermined value L2. The value L2 is set lower than the limit value L1. This value L2 is set to 300 in this example where the value L1 is set to 382.

When the total ink density ND is not higher than the value L2 (no in S120), the values of the multilevel data C, M, M, and K for the subject pixel (i, j) are subjected to the binarization process of S140 in the same manner as in the first embodiment. That is, the multilevel data set (C, M, Y, K) is converted into the binary data set (Cb, Mb, Yb, Kb), and the obtained binary data set (Cb, Mb, Yb, Kb) is stored in the RAM 28 or the data storage medium 31 set in the device 30.

On the other hand, when the total ink density ND is higher than the predetermined value L2 (yes in S120), the reduction process is executed in S130. In the reduction process of S130, the reduction coefficient RAT is calculated as indicated by the following formula (12):

$$RAT \leftarrow \{[1-((NDX-ND)/(NDX-L2))^\kappa] \cdot (L1-L2)+L2\}/ND \quad (12)$$

where NDX represents the predetermined possible maximum value (510, in this case) for the total ink amount ND, ND represents the total ink amount for the subject pixel (i, j), which is defined by the formula (4), L1 is the predetermined limit (382 in this example,) L2 is the other predetermined limit (300 in this example,) and k is a predetermined fixed value (2.6 in this example.)

Thus, according to the present embodiment, the reduction coefficient RAT is not calculated by the formula (5).

Then, in the same manner as in the first embodiment, the corrected values C1, M1, and Y1 are multiplied by the reduction coefficient RAT as indicated by the formulas (6)–(8). Thus, the quantity-reduced corrected values C2, M2, and Y2 are obtained. Then, the formulas (9)–(11) are calculated to obtain the quantity-reduced multilevel data C3, M3, and Y3. Thus obtained multilevel data C3, M3, and Y3 and the original black data K are binarized in S140 in the same manner as in the first embodiment.

According to the present embodiment, the formula (12) is determined so that the reduction coefficient RAT gradually decreases as the total ink density ND increases as shown in FIG. 6(b). The coefficient RAT is higher than zero (0) and lower than one (1), and decreases more slowly as the increase of the value ND in comparison with the RAT defined in the first embodiment as shown in FIG. 6(a). Accordingly, the reduction operation can provide more preferable color reproducibility.

While the invention has been described in detail with reference to the specific embodiments thereof, it would be apparent to those skilled in the art that various changes and modifications may be made therein without departing from the spirit of the invention.

For example, in the above description, the binarization step of S140 is provided in the total ink amount limiting binarization process. However, the total ink amount limiting process from S100–S130 and S150 can be performed separately from the binarization process of S140. That is, first, the process for selectively reducing the quantity of the chromatic color data is performed onto all the pixels (i, j). As a result, selectively quantity-reduced multilevel data (C', M', Y', K) (=(C3, M3, Y3, K) or (C, M, Y, K)) is obtained for each pixel. Then, the binarization process is performed onto the selectively quantity-reduced data of all the pixels.

In the first embodiment, the reduction process of S130 is designed to calculate the formulas (5)–(8), thereby obtaining the quantity-reduced corrected values C2, M2, and Y2. However, a table 40, storing a plurality of quantity-reduced multilevel values F (=C3, M3, and Y3), may be previously prepared as shown in FIG. 8(a). Data of the table 40 may be stored together with data of the ink amount limiting binarization program of FIGS. 3 and 4 in the data storage medium 31. The table 40 stores therein all the possible values (ND-K) of 0–510 in the horizontal row and stores therein all the possible values (multilevel value-K) of 0–255 for each color component in the vertical row. A value F (ND-K, multilevel data-K) stored at a table location (ND-K, multilevel data-K) is a value obtained by the following formula:

$$F(ND-K, \text{multilevel data}-K)=(\text{multilevel data}-K)\times\{(L1-K)/(ND-K)\}+K$$

Accordingly, in S130, the values C3, M3, and Y3 are obtained through simply selecting the values F(ND-K, C-K), F(ND-K, M-K), and F(ND-K, Y-K) from the locations (ND-K, C-K), (ND-K, M-K), and (ND-K, Y-K) in the table 40.

It is noted that the table 40 may be prepared to store a plurality of quantity-reduced correct values F' (=C2, M2, or Y2) for all the plurality of data (ND-K) and all the plurality of data (multilevel data-K). In this case, F'(ND-K, multilevel data-K) (multilevel data-K)×{(L1-K)/(ND-K)}. Multilevel data (C3, M3, or Y3) can be calculated through adding the black data K to the data (C2, M2, or Y2) selected from the table 40.

Alternatively, a table 41 shown in FIG. 8(b) may be previously produced and stored together with data of the program of FIGS. 3 and 4 in the data storage medium 31. The table 41 is prepared to store values of the coefficient RAT for all the possible values (ND-K) from zero (0) to 510. That is, the table 41 lists all the possible values (ND-K).

The table 41 further stores the values g(ND-K) in correspondence with the values (ND-K). Each value g(ND-K) is represented by the following formula:

$$g(ND-K)=(L1-K)/(ND-K).$$

Accordingly, in S130, the coefficient RAT is selected from the table 41 in accordance with the already-calculated total amount ND and the black value K. Then, the quantity-reduced multilevel values C3, M3, and Y3 are obtained through calculating the following formulas:

$$C3 \leftarrow g(ND-K) \times (C-K)+K$$

$$M3 \leftarrow g(ND-K) \times (M-K)+K$$

$$Y3 \leftarrow g(ND-K) \times (Y-K)+K$$

In the above-described embodiments, the ink amount limiting binarization processing of FIGS. 3 (or 7) and 4 is attained onto multilevel data (C, M, Y, K) which is defined in the CMYK colorimetric system. For example, this multilevel data (C, M, Y, K) may be obtained through color conversion from color data defined in another colorimetric system, for example, a RGB colorimetric system. The processes of the above-described embodiments can therefore be modified as shown in FIG. 9(a) to first perform a color conversion process to convert halftone color image multilevel data (R, G, B) defined in the RGB colorimetric system, for example, into the color data (C, M, Y, K) of the CMYK colorimetric system, then to perform the ink amount limiting process of S100–S130, and then to perform the binarization process of S140.

It is noted that the color conversion from the RGB system to the CMYK system can be performed with using a look up table (LUT). The LUT is previously prepared to store therein all the possible sets of values (R, G, B) defined in the RGB system, in correspondence with a plurality of multilevel value sets (C, M, Y, K) which are prepared to reproduce the same colors as the corresponding value sets (R, G, B). The LUT may be stored together with the data of the program of FIGS. 3 (or 7) and 4 in the data storage medium 31. Color conversion is performed through simply selecting CMYK data from the LUT according to the inputted RGB data.

It is noted that the LUT can be modified to store, in correspondence with all the RGB data sets (R, G, B), selectively quantity-reduced multilevel data sets (C', M', Y', K) (=(C3, M3, Y3, K) or (C, M, Y, K)) which are obtained through selectively subjecting the corresponding multilevel data sets (C, M, Y, K) to the ink amount limiting reduction process from S100–S130. With using this LUT, the RGB-CMYK conversion process and the ink amount limiting process of the present invention can be performed simultaneously onto the RGB data as shown in FIG. 9(b). Binary CMYK data (Cb, Mb, Yb, Kb) is then obtained from the thus obtained selectively quantity-reduced data (C', M', Y', K). Thus, the single conversion process with using the look up table can simultaneously perform both the colorimetric system conversion and the total ink amount limiting operation. The operation can be performed highly efficiently and with a high speed.

The processes of the first and second embodiments are performed onto multilevel data (C, M, Y, K) whose chromatic color data C, M, and Y include therein achromatic (black) color data K. The achromatic color data K is defined to have a minimum value among the chromatic data C, M, and Y. However, the process of the present invention can be applied to another type of multilevel data (C1, M1, Y1, K) whose chromatic color data C1, M1, and Y1 include no black color component K therein. The multilevel data (C1, M1, Y1, K) of this type has a relationship defined by the formulas (1)–(3) with the multilevel data (C, M, Y, K) of the type used in the first and second embodiments. In order to perform an ink amount limiting binarization onto this type of multilevel data (C1, M1, Y1, K), the ink amount limiting binarization processing of the first and second embodiments may be modified not to perform the calculations of the formulas (1)–(3) and (9)–(11). The formula (5) is modified in the following:

$$RAT=(L1-K)/(C1+M1+Y1)$$

In the first and second embodiments, the printer 2 is controlled to perform recording operation with ink of four colors: cyan, magenta, yellow, and black. However, the printer 2 can be controlled to perform recording operation with ink of only three colors: cyan, magenta, and yellow. In this case, the black data K is used as satisfies the equation K=0. Because K=0, it is unnecessary to calculate the formulas (1)–(3) and (9)–(11). In addition, because K=0. the reduction coefficient RAT can be modified as follows:

$$RAT \leftarrow L1/ND.$$

Thus, when the total value ND (=C+M+Y) is higher than the limit value L1 (yes in S120), the program proceeds to S130, in which the color data (C, M, Y) is reduced into quantity-reduced data (C2, M2, Y2) through multiplying the color value (C, M, Y) by the ratio between the predetermined limit value L1 and the total value ND (=C+M+K). Thus obtained data (C2, M2, Y2) will be binarized into binary data (C, M, Y).

It is noted that a plurality of quantity-reduced data may be previously stored in a table in a similar manner as in FIG. 8(a). In this table, a plurality of quantity-reduced values F(ND, multilevel data) (=C2, M2, or Y2) are arranged in accordance with a plurality of possible values ND and a plurality of possible multilevel values. It is noted that F(ND, multilevel data) (multilevel data)×L1/ND. Alternatively, a table can be previously prepared to store a plurality of values g(ND)=L1/ND in correspondence with a plurality of possible values ND in the similar manner as shown in FIG. 8(b). The quantity-reduced value C2 (M2, or Y2) can be obtained through selecting the corresponding value g(ND) and multiplying the value C1 (M1, or Y1) by the selected value g(ND).

In the above-described embodiments, the selectively quantity-reduced multilevel data (C', M', Y', K) (=(C3, M3, Y3, K) or (C, M, Y, K)) is converted in S140 into binary data (Cb, Mb, Yb, Kb) indicative of whether or not to eject ink onto paper. However, the selectively quantity-reduced multilevel data (C', M', Y', K) may be converted into other various types of ink amount representing data (Ci, Mi, Yi. Ki), such as base three data, indicative of an amount of ink to be ejected.

In order to convert the selectively quantity-reduced multilevel data (C', M', Y', K) (=(C3, M3, Y3, K) or (C, M, Y, K)) into three base data, for example, each of the values C', M', Y', and K is compared with two threshold values defined in two different dither matrices. Thus, each value C', M', Y', or K is converted into three different data: data OFF indicating not to eject ink; data ON1 indicating to eject ink of a first amount; and data ON2 indicating to eject ink of a second amount larger than the first amount. The printer 2 will be controlled by the data OFF not to eject ink. The printer will be controlled by the data ON1 to eject ink of the first amount. The printer will be controlled by the data ON2 to eject ink of the second amount.

In the above-described embodiments, each chromatic color data is reduced dependent on the sum ND of all the chromatic color data and the achromatic color data. However, each chromatic color data may be reduced simply based on the corresponding quantity. For example, color data C1 can be reduced based on the amount thereof.

As described above, according to the above-described embodiments, the quantity-reduced multilevel data (C3, M3, Y3, K) is obtained through reducing the amount of multilevel data for each color. Because the quantity-reduced multilevel data (C3, M3, Y3, K) is subjected to the binarization process of S140, it is possible to lower the possibility that the quantity-reduced multilevel data (C3, M3, Y3, K) be binarized to ON binary data. It is possible to decrease the amount of ink to be attached on the recording medium such as a print paper. When the recording operation is performed with the thus binarized data, the total amount of ink located on the entire image is reduced, thereby preventing the cockling problem.

The reduction process with the formulas (6)–(8) reduces the quantity of each multilevel data C1, M1, Y1 of each pixel according to the quantity of the subject multilevel data. Accordingly, the multilevel data for all the pixels are not reduced in a single fixed manner. Color reproducibility is not deteriorated.

The predetermined limiting value L1 is set to be lower than the possible maximum value NDX of the total amount ND and to be equal to or lower than a predetermined highest value which can prevent the cockling problem. The reduction process limits the total amount ND of the multilevel data of each pixel equal to or lower than the predetermined limit value L1. It is therefore possible to prevent the cockling problem.

The reduction process is attained only when the sum of the multilevel data is higher than the predetermined limiting value L1 because cockling will not occur when the multilevel data is small.

The binarization process of S140 is performed so that any other chromatic color ink will not be located at the position where black color ink is located. Accordingly, the reduction process of S130 is performed only for chromatic colors. When chromatic data is designed to include achromatic color data therein, corrected values C1, M1, and Y1 are first obtained through subtracting the black color data K from the chromatic data C, M, and Y. Then, the corrected values C1, M1, and Y1 are subjected to the reduction operation which is determined according to the quantity of the corrected values, and quantity-reduced corrected values C2, M2, and Y2 are obtained for all the chromatic colors. Then, quantity-reduced multilevel data C3, M3, and Y3 for all the chromatic colors are obtained through adding the quantity-reduced corrected values with the black color multilevel data. The quantity-reduced multilevel data of all the chromatic colors and the multilevel data of the black color are subjected to the binarization process. Thus, the cockling phenomenon will not occur. Any changes are not affected onto color reproducibility.

Cockling will not occur for a pixel where black ink is located. This is because any other ink is not placed on the black color located point. Accordingly, the reduction process is not attained onto the black color data in the above-described embodiments. However, the black data may be subjected to the reduction process in the same manner as for the chromatic colors. Or, only one or two of the color component data C, M, Y, and K may be subjected to the reduction process.

It is sufficient that the reduction process be performed only when the sum of the corrected values C1, M1, and Y1 of all the chromatic colors and the black color value K is higher than the predetermined limit L1. This is because the limit L1 is determined as indicative of a maximum value of a total ink amount which will not occur the cockling phenomenon.

According to one of the modifications, the binarization process can be performed simultaneously when the halftone image data of one colorimetric system is converted into halftone image data of another colorimetric system. For example, the colorimetric system conversion table may be prepared in correspondence with both the method of converting halftone data of one colorimetric system into halftone data of another colorimetric system and the above-described ink amount limiting method.

Data of the program of FIGS. 3 (or 7) and 4 are originally stored in the data recording medium 31 such as a floppy disk, a magnetooptical disk, a CD-ROM, or the like. The program is loaded from the data recording medium to the computer 4 and executed by the computer 4 when required.

What is claimed is:

1. A method of converting multilevel data indicative of a color halftone image into ink amount representing data indicative of a corresponding color pseudo-halftone image, the method comprising the steps of:

inputting multilevel data of a plurality of colors which indicate densities of the plurality of colors to reproduce a color halftone image, the multilevel data of the plurality of colors including multilevel data of several chromatic colors and multilevel data of a black color;

selectively performing a reduction process to reduce a quantity of the multilevel data of the chromatic colors, without performing the reduction process onto the multilevel data of the black color, thereby obtaining selectively quantity-reduced multilevel data for the chromatic colors and non-reduced multilevel data for the black color; and converting each of the selectively quantity-reduced multilevel data of each chromatic color and the non-reduced multilevel data of the black color into ink amount representing data which represents an ink amount of a corresponding color to reproduce the color halftone image.

2. A method as claimed in claim 1, wherein the conversion step converts each of the selectively quantity-reduced multilevel data of each chromatic color and the non-reduced multilevel data of the black color into binary data which represents whether or not to eject ink of a corresponding color to reproduce the color halftone image.

3. A method as claimed in claim 2, wherein the conversion step includes the steps of:

converting, at each pixel location, each of the selectively quantity-reduced multilevel data of each chromatic color and the non-reduced multilevel data of the black color into binary data which represents whether or not to eject ink of a corresponding color;

judging, at each pixel location, whether or not the non-reduced multilevel data of the black color is converted into binary data which indicates ejection of ink of the black color; and performing, at a pixel location whose non-reduced multilevel data of the black color is judged to be converted into binary data indicating ejection of ink of the black color, a correction to correct the binary data for each chromatic color into binary data indicating not to eject ink of a corresponding color.

4. A method as claimed in claim 1, wherein the reduction process is attained to reduce the quantity of the multilevel data in accordance with the quantity of the multilevel data.

5. A method as claimed in claim 4, further comprising the step of comparing a total density representing value, indicated by a sum of the multilevel data of all the plurality of colors, with a predetermined limit value, the reduction process being attained only when the total density representing value is higher than the predetermined limit value.

6. A method as claimed in claim 5, wherein the reduction process reduces the multilevel data for the each chromatic color into the quantity-reduced multilevel data which is determined through multiplying the multilevel data by a ratio of a value obtained by subtracting the multilevel data of black color from the predetermined limit value with respect to the total density representing value indicated by the sum of the multilevel data of all the chromatic colors.

7. A method as claimed in claim 5, wherein the reduction process reduces the multilevel data for each chromatic color into the quantity-reduced multilevel data which is determined through multiplying the multilevel data by a reduction coefficient which is higher than zero and lower than one and which decreases in accordance with increase of the total density representing value which is indicated by the sum of the multilevel data of all the plurality of colors.

8. A method as claimed in claim 4, wherein the multilevel data of each of the several chromatic colors has a sum of a value indicative of a corresponding chromatic color component of the color halftone image and a value indicative of a black color component of the color halftone image, the multilevel data of black color having the value indicative of the black color component, further comprising the step of obtaining a correct value for each of the several chromatic colors through subtracting the multilevel data of the black color from the multilevel data of a corresponding chromatic color, and wherein the reduction process includes the steps of:

selectively reducing the quantity of the correct value of each chromatic color according to the quantity thereof; and obtaining selectively quantity-reduced multilevel data for each chromatic color through adding the selectively quantity-reduced corrected value with the multilevel data for the black color.

9. A method as claimed in claim 8, further comprising the step of judging whether or not a sum of the correct values for all the several chromatic colors and the multilevel data for black color is higher than a predetermined limit value, the reduction process being performed only when the sum of the correct values for all the several chromatic colors and the multilevel data for black color is higher than the predetermined limit value.

10. A method as claimed in claim 9, wherein the reduction process reduces the correct value of the multilevel data for each chromatic color into the quantity-reduced correct data which is determined through multiplying the correct value of the multilevel data by a ratio between a value, obtained by subtracting the multilevel data of black color from the predetermined limit value, and a value, obtained by subtracting the multilevel data of black color from the sum of the correct values for all the several chromatic colors and the multilevel data for black color.

11. A method as claimed in claim 9, wherein the reduction process reduces the correct value of the multilevel data for each chromatic color into the quantity-reduced correct data which is determined through multiplying the correct value of the multilevel data by a reduction coefficient which is higher than zero and lower than one and which decreases in accordance with increase of the sum of the correct values for all the several chromatic colors and the multilevel data for black color.

12. A method as claimed in claim 8, further comprising the step of judging whether or not a sum of the correct values for all the several chromatic colors and the multilevel data for black color is higher than another predetermined limit which is lower than the predetermined limit, the reduction process being performed only when the sum of the correct values for all the several chromatic colors and the multilevel data for black color is higher than the other predetermined limit, wherein the reduction process reduces the correct value of the multilevel data for each chromatic color into the quantity-reduced correct data which is determined through multiplying the correct value of the multilevel data by another reduction coefficient RAT which is higher than zero and lower than one and which decreases in accordance with increase of the sum of the correct values for all the several chromatic colors and the multilevel data for black color, the coefficient RAT being defined by the following formula:

$$RAT=\{[1-((NDX-ND)/(NDX-L2))^K]\cdot(L1-L2)+L2\}/ND$$

where ND represents the sum, L1 represents the predetermined limit, L2 represents the other predetermined limit lower than L1, NDX represents a predetermined possible maximum value for the sum ND, and K is a predetermined fixed value.

13. A method as claimed in claim 4, wherein the reduction process includes the step of selecting a value of the quantity-reduced multilevel data from a table, which previously stores therein a plurality of values of quantity-reduced multilevel data in correspondence with a plurality of values of multilevel data, the selecting step selecting the value of the quantity-reduced multilevel data in accordance with the multilevel data to be reduced.

14. A method as claimed in claim 4, wherein the reduction process includes the step of calculating a value of the quantity-reduced multilevel data in accordance with the multilevel data to be reduced.

15. A method as claimed in claim 4, wherein the plurality of chromatic colors include three subtractive primaries.

16. A method as claimed in claim 1, wherein the multilevel data for the plurality of colors is defined in a first colorimetric system, wherein the inputting step includes the step of inputting multilevel data of another plurality of colors defined in a second colorimetric system different from the first colorimetric systems, and wherein the reduction process performing step includes the step of converting the multilevel data of the second colorimetric system into the multilevel data of the first colorimetric system while selectively reducing the quantity of the multilevel data.

17. A method as claimed in claim 16, wherein the colorimetric system conversion step includes the step of selecting selectively quantity-reduced multilevel data defined in the first colorimetric system from a table, which previously stores therein a plurality of selectively quantity-reduced multilevel data in the first colorimetric system in correspondence with a plurality of multilevel data in the second colorimetric system, each of the selectively quantity-reduced multilevel data being produced through converting corresponding multilevel data defined in the second colorimetric system into multilevel data of the first colorimetric system and selectively reducing the quantity of the multilevel data.

18. A method as claimed in claim 1, further comprising the step of controlling an ink jet printer to selectively eject ink of the plurality of colors with their amounts being controlled based on the ink amount representing data of the plurality of colors.

19. A method as claimed in claim 2, further comprising the step of controlling an ink jet printer to selectively eject ink of the plurality of colors based on the binary data of the plurality of colors.

20. A method of adjusting multilevel data indicative of a color halftone image so as to reproduce the color halftone image with a limited amount of ink, the method comprising the steps of:

inputting multilevel data of a plurality of colors which indicate densities of the plurality of colors to reproduce a color halftone image, the multilevel data of the plurality of colors including multilevel data of several chromatic colors and multilevel data of black color; and selectively performing a reduction process to reduce a quantity of the multilevel data of the chromatic colors without performing the reduction process onto the multilevel data of the black color, thereby obtaining selectively quantity-reduced multilevel data for the chromatic colors and non-reduced multilevel data for the black color, the selectively quantity-reduced multilevel data of the chromatic colors and the non-reduced multilevel data of the black color indicating the color halftone image with a limited amount of ink.

21. A device for converting multilevel data indicative of a color halftone image into ink amount representing data indicative of a corresponding color pseudo-halftone image, the device comprising:

means for inputting multilevel data of a plurality of colors which indicate densities of the plurality of colors to reproduce a color halftone image, the multilevel data of the plurality of colors including multilevel data of several chromatic colors and multilevel data of black color;

means for selectively performing a reduction process to reduce a quantity of the multilevel data of the chromatic colors, without performing the reduction process onto the multilevel data of the black color, thereby obtaining selectively quantity-reduced multilevel data for the chromatic colors and non-reduced multilevel data for the black color; and means for converting each of the selectively quantity-reduced multilevel data of each chromatic color and the non-reduced multilevel data of the black color into ink amount representing data which represents an ink amount of a corresponding color to reproduce the color halftone image.

22. A device as claimed in claim 21, wherein the conversion means converts each of the selectively quantity-reduced multilevel data of each chromatic color and the non-reduced multilevel data of the black color into binary data which represents whether or not to eject ink of a corresponding color to reproduce the color halftone image.

23. A device as claimed in claim 22, wherein the conversion means includes:

means for converting, at each pixel location, each of the selectively quantity-reduced multilevel data of each chromatic color and the non-reduced multilevel data of the black color into binary data which represents whether or not to eject ink of a corresponding color;

means for judging, at each pixel location, whether or not the non-reduced multilevel data of the black color is converted into binary data which indicates ejection of ink of the black color; and means for performing, at a pixel location whose non-reduced multilevel data of the black color is judged to be converted into binary data indicating ejection of ink of the black color, a correction to correct the binary data for each chromatic color into binary data indicating not to eject ink of a corresponding color.

24. A device as claimed in claim 21, wherein the reduction means selectively reduces the quantity of the multilevel data in accordance with the quantity of the multilevel data.

25. A device as claimed in claim 24, further comprising means for comparing a total density representing value, indicated by a sum of the multilevel data of all the plurality of colors, with a predetermined limit value, the reduction means performing the reduction process only onto the multilevel data whose total density representing value is higher than the predetermined limit value.

26. A device as claimed in claim 25, wherein the reduction means reduces the multilevel data for each chromatic color into the quantity-reduced multilevel data which is determined through multiplying the multilevel data by a ratio of a value obtained by subtracting the multilevel data of black color from the predetermined limit value with respect to the total density representing value indicated by the sum of the multilevel data of all the chromatic colors.

27. A device as claimed in claim 25, wherein the reduction means reduces the multilevel data for each chromatic color into the quantity-reduced multilevel data which is determined through multiplying the multilevel data by a reduction coefficient which is higher than zero and lower than one and which decreases in accordance with increase of the total density representing value which is indicated by the sum of the multilevel data of all the plurality of colors.

28. A device as claimed in claim 24, wherein the multilevel data of each of the several chromatic colors has a sum of a value indicative of a corresponding chromatic color component of the color halftone image and a value indicative of a black color component of the color halftone image, the multilevel data of black color having the value indicative of the black color component, further comprising means for obtaining a correct value for each of the several chromatic colors through subtracting the multilevel data of the black color from the multilevel data of a corresponding chromatic color, and wherein the reduction means includes:

means for selectively reducing the quantity of the correct value of each chromatic color according to the quantity thereof; and means for obtaining selectively quantity-reduced multilevel data for each chromatic color through adding the selectively quantity-reduced corrected value with the multilevel data for the black color.

29. A device as claimed in claim 28, further comprising means for judging whether or not a sum of the correct values for all the several chromatic colors and the multilevel data for black color is higher than a predetermined limit value, the reduction means performing the reduction process only when the sum of the correct values for all the several chromatic colors and the multilevel data for black color is higher than the predetermined limit value.

30. A device as claimed in claim 29, wherein the reduction means reduces the correct value of the multilevel data for each chromatic color into the quantity-reduced correct data which is determined through multiplying the correct value of the multilevel data by a ratio between a value, obtained by subtracting the multilevel data of black color from the predetermined limit value, and a value, obtained by subtracting the multilevel data of black color from the sum of the correct values for all the several chromatic colors and the multilevel data for black color.

31. A device as claimed in claim 29, wherein the reduction means reduces the correct value of the multilevel data for each chromatic color into the quantity-reduced correct data which is determined through multiplying the correct value of the multilevel data by a reduction coefficient which is higher than zero and lower than one and which decreases in accordance with increase of the sum of the correct values for all the several chromatic colors and the multilevel data for black color.

32. A device as claimed in claim 28, further comprising means for judging whether or not a sum of the correct values for all the several chromatic colors and the multilevel data for black color is higher than another predetermined limit which is lower than the predetermined limit, the reduction means performing the reduction process only when the sum of the correct values for all the several chromatic colors and the multilevel data for black color is higher than the other predetermined limit, wherein the reduction process reduces the correct value of the multilevel data for each chromatic color into the quantity-reduced correct data which is determined through multiplying the correct value of the multilevel data by another reduction coefficient RAT which is higher than zero and lower than one and which decreases in accordance with increase of the sum of the correct values for all the several chromatic colors and the multilevel data for black color, the coefficient RAT being defined by the following formula:

$$RAT=\{[1-((NDX-ND)/(NDX-L2))^\upsilon]\cdot(L1-L2)+L2\}/ND$$

where ND represents the sum, L1 represents the predetermined limit, L2 represents the other predetermined limit lower than L1, NDX represents a predetermined possible maximum value for the sum ND, and $\upsilon$ is a predetermined fixed value.

33. A device as claimed in claim 24, wherein the reduction means includes means for selecting a value of the quantity-reduced multilevel data from a table, which previously stores therein a plurality of values of quantity-reduced multilevel data in correspondence with a plurality of values of multilevel data, the selecting means selecting the value of the quantity-reduced multilevel data in accordance with the multilevel data to be reduced.

34. A device as claimed in claim 24, wherein the reduction means includes means for calculating a value of the quantity-reduced multilevel data in accordance with the multilevel data to be reduced.

35. A device as claimed in claim 24, wherein the plurality of chromatic colors include three subtractive primaries.

36. A device as claimed in claim 21, wherein the multilevel data for the plurality of colors is defined in a first colorimetric system,
wherein the inputting means includes means for inputting multilevel data of another plurality of colors defined in a second colorimetric system different from the first colorimetric system, and
wherein the reduction process performing means includes means for converting the multilevel data of the second colorimetric system into the multilevel data of the first colorimetric system while selectively reducing the quantity of the multilevel data.

37. A device as claimed in claim 36, wherein the colorimetric system conversion means includes means for selecting selectively quantity-reduced multilevel data defined in the first colorimetric system from a table, which previously stores therein a plurality of selectively quantity-reduced multilevel data in the first colorimetric system in correspondence with a plurality of multilevel data in the second colorimetric system, each of the selectively quantity-reduced multilevel data being produced through converting corresponding multilevel data defined in the second colorimetric system into multilevel data of the first colorimetric system and selectively reducing the quantity of the multilevel data.

38. A device as claimed in claim 21, further comprising means for controlling an ink jet printer to selectively eject ink of the plurality of colors with their amounts being controlled based on the ink amount representing data of the plurality of colors.

39. A device as claimed in claim 22, further comprising means for controlling an ink jet printer to selectively eject ink of the plurality of colors based on the binary data of the plurality of colors.

40. A device for adjusting multilevel data indicative of a color halftone image so as to reproduce the color halftone image with a limited amount of ink, the device comprising:
means for inputting multilevel data of a plurality of colors which indicate densities of the plurality of colors to reproduce a color halftone image, the multilevel data of the plurality of colors including multilevel data of several chromatic colors and multilevel data of black color; and
means for selectively performing a reduction process to reduce a quantity of the multilevel data of of the chromatic colors, without performing the reduction process onto the multilevel data of the black color, thereby obtaining selectively quantity-reduced multilevel data for the chromatic colors and non-reduced multilevel data for the black color, the selectively quantity-reduced multilevel data of the chromatic colors and the non-reduced multilevel data of the black color indicating the color halftone image with a limited amount of ink.

41. A program storage medium for storing data of a program indicative of a process for converting multilevel data indicative of a color halftone image into binary data indicative of a corresponding color pseudo-halftone image, the program comprising:
a program of inputting multilevel data of a plurality of colors which indicate densities of the plurality of colors to reproduce a color halftone image, the multilevel data of the plurality of colors including multilevel data of several chromatic colors and multilevel data of black color;
a program of selectively performing a reduction process to reduce a quantity of the multilevel data of the chromatic colors, without performing the reduction process onto the multilevel data of the black color, thereby obtaining selectively quantity-reduced multilevel data for the chromatic colors and non-reduced multilevel data for the black color; and
a program of converting each of the selectively quantity-reduced multilevel data of each chromatic color and the non-reduced multilevel data of the black color into ink amount representing data which represents an ink amount of a corresponding color to reproduce the color halftone image.

42. A program storage medium as claimed in claim 41, wherein the reduction process is attained to reduce the quantity of the multilevel data in accordance with the quantity of the multilevel data.

43. A method of converting multilevel data indicative of a color halftone image into ink amount representing data indicative of a corresponding color pseudo-halftone image, the method comprising the steps of:
inputting multilevel data of a plurality of colors which indicate densities of the plurality of colors to reproduce a color halftone image, the multilevel data for the plurality of colors being defined in a colorimetric system;
converting the multilevel data of the colorimetric system into multilevel data of another colorimetric system, different from the colorimetric system, while selectively performing a reduction process to reduce a quantity of the multilevel data for at least one of the plurality of colors, thereby obtaining selectively quantity-reduced multilevel data for the at least one color; and
converting the selectively quantity-reduced multilevel data of each color into ink amount representing data which represents an ink amount of a corresponding color to reproduce the color halftone image.

44. A device for converting multilevel data indicative of a color halftone image into ink amount representing data indicative of corresponding color pseudo-halftone image, the device comprising:

means for inputting multilevel data of a plurality of colors which indicate densities of the plurality of colors to reproduce a color halftone image, the multilevel data for the plurality of colors being defined in a colorimetric system;

means for converting the multilevel data of the colorimetric system into multilevel data of another colorimetric system, different from the colorimetric system, while selectively performing a reduction process to reduce quantity of the multilevel data for at least one of the plurality of colors, thereby obtaining selectively quantity-reduced multilevel data for the at least one color; and means for converting the selectively quantity-reduced multilevel data of each color into ink amount representing data which represents an ink amount of a corresponding color to reproduce the color halftone image.

45. A program storage medium for storing data of a program indicative of a process for converting multilevel data indicative of a color halftone image into binary data indicative of a corresponding color pseudo-halftone image, the program comprising:

a program of inputting multilevel data of a plurality of colors which indicate densities of the plurality of colors to reproduce a color halftone image, the multilevel data for the plurality of colors being defined in a colorimetric system;

a program of converting the multilevel data of the colorimetric system into multilevel data of another colorimetric system, different from the colorimetric system, while selectively performing a reduction process to reduce a quantity of the multilevel data for at least one of the plurality of colors, thereby obtaining selectively quantity-reduced multilevel data for the at least one color; and a program of converting the selectively quantity-reduced multilevel data of each color into ink amount representing data which represents an ink amount of a corresponding color to reproduce the color halftone image.

\* \* \* \* \*